United States Patent

Shaw et al.

Patent Number: 6,161,261
Date of Patent: Dec. 19, 2000

[54] FASTENING TENSION STRAP WITH INTEGRAL HANDLE EXTENSIONS

[76] Inventors: Steven P. Shaw, 2717 Wellington St., North Dighton, Mass. 02764; Joseph M. Amaral; Timothy Amaral, both of 201 New St., Rehoboth, Mass. 02769

[21] Appl. No.: 09/161,887

[22] Filed: Sep. 28, 1998

[51] Int. Cl.[7] ................................................ A44B 21/00
[52] U.S. Cl. .............................................................. 24/300
[58] Field of Search ............................. 24/298, 300, 301, 24/265 H, 302; 248/499; 267/74; 410/97

[56] References Cited

U.S. PATENT DOCUMENTS

| | | |
|---|---|---|
| 1,486,138 | 3/1924 | Hanson . |
| 2,289,225 | 7/1942 | Tonai . |
| 2,308,336 | 1/1943 | Mason . |
| 3,533,172 | 10/1970 | Jones . |
| 4,769,875 | 9/1988 | Hartman ........................ 24/300 |
| 4,831,692 | 5/1989 | Chuan . |
| 5,253,393 | 10/1993 | Levin . |
| 5,383,259 | 1/1995 | McIntire . |
| 5,848,864 | 12/1998 | Selby . |

*Primary Examiner*—James R. Brittain

[57] ABSTRACT

A flexible tension strap comprised of a resilient material with integral handle extensions located at each end of the strap providing the user with a hand-hold during the stretching of the strap to ease the connection and disconnection of the strap.

6 Claims, 3 Drawing Sheets

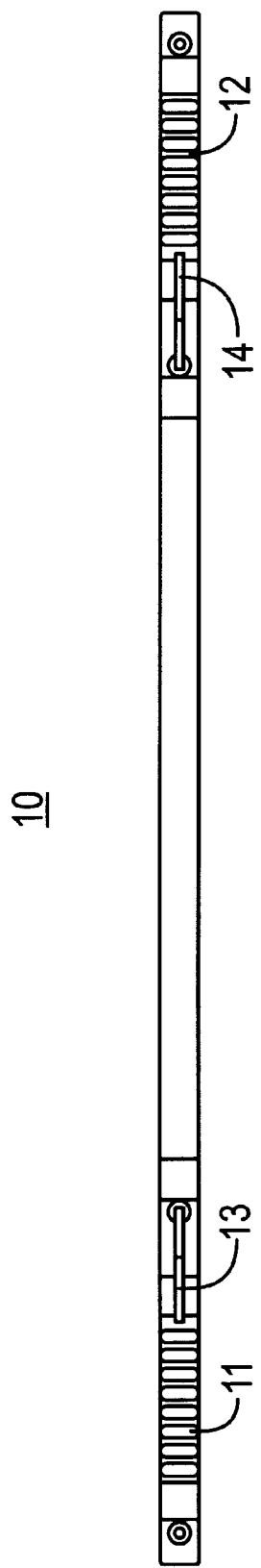

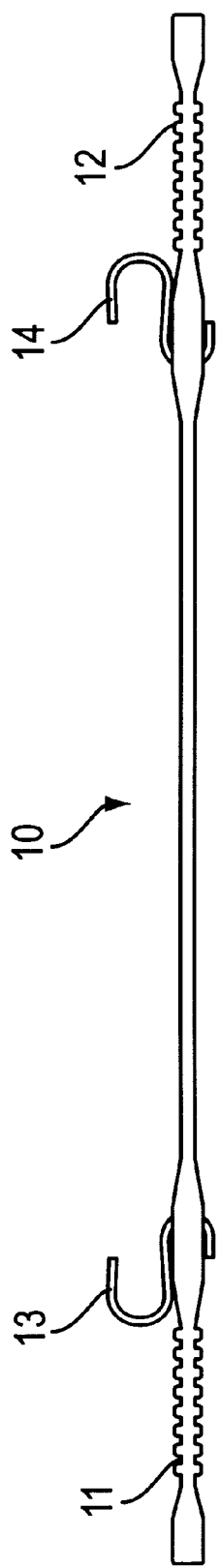

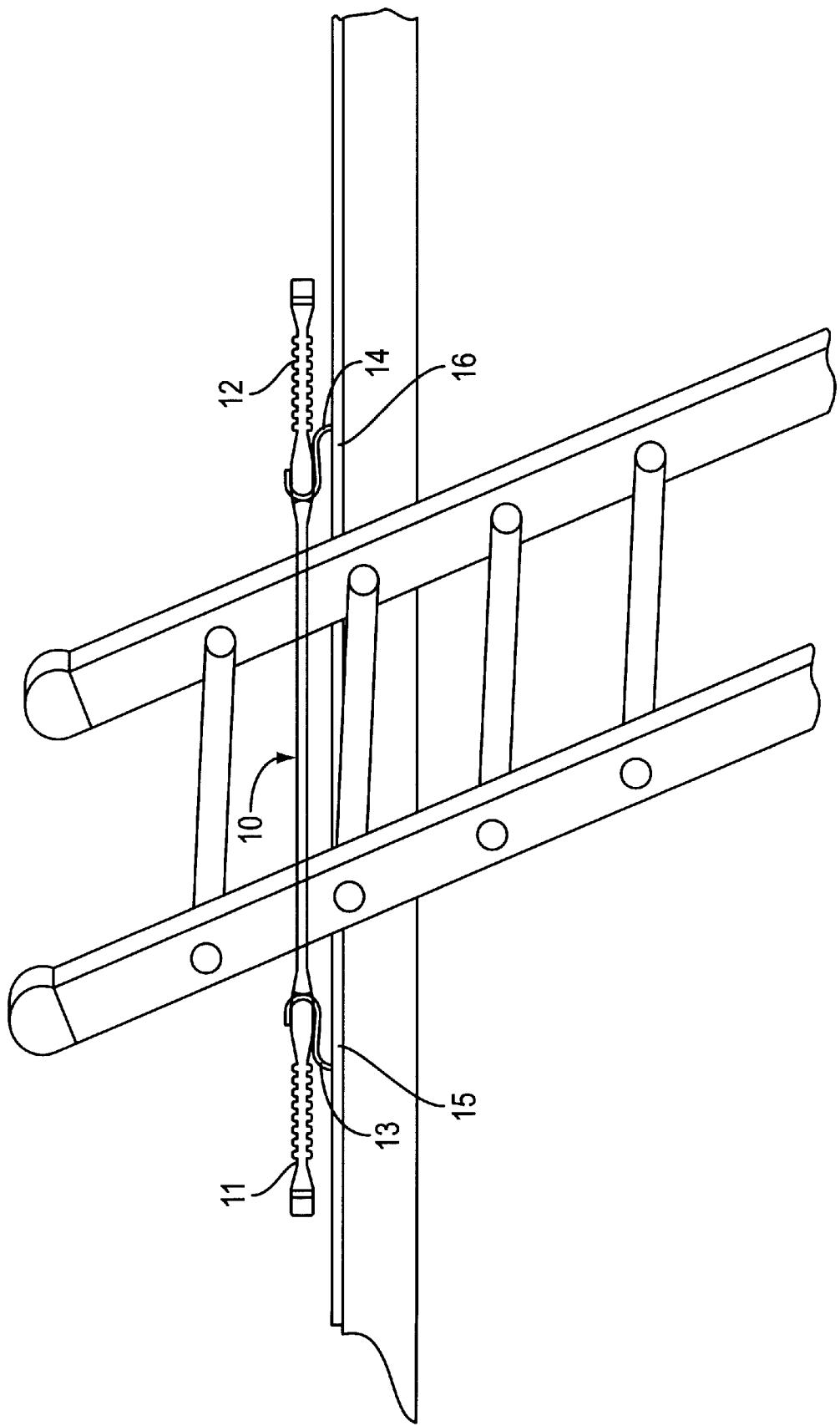

FASTENING TENSION STRAP WITH INTEGRAL HANDLE EXTENSIONS

FIELD OF INVENTION

The present invention relates to a fastening tension strap with integral handle extensions permitting the strap to be stretched easily during its connection and disconnection.

DESCRIPTION OF PRIOR ART

Fastening tension straps which are comprised of a resilient material with attachment hooks at either end so that they may be expanded in order to provide a positive tension for holding fast the item or items located between the ends are well known in the art. U.S. Pat. No. 1,962,585 to Faure-Roux discloses the general concept of an expandable tension strap. The resilient nature of these straps provide the ability to expand and contract them repeatedly without substantially affecting their future resiliency so they may be reused, however the connection of the second attachment hook is often difficult as the strap needs to be stretched against its tendency to return to its original length while the hook has to be held and attached at the same time. There does not exist any method by which the user of a tension strap may connect the second attachment hook by a means alternative to the grasping of the hook itself permitting greater ease of attachment.

Therefore, there exists a need for a tension strap which has an alternative means of attachment permitting the user to connect both attachment hooks without having to grasp the hooks themselves.

It as an object of the present invention to provide a resilient fastening tension strap with integral handle extensions to prevent the need for attachment of the device through the handling of the attachment hooks themselves, therefore permitting greater ease of use.

SUMMARY OF THE INVENTION

Accordingly, the invention is comprised of a fastening tension strap which is itself comprised of a resilient material having integral handle extensions at each end to provide for a hand-hold to stretch the strap more easily during attachment.

The invention provides an easier method for the attachment of a fastening tension strap without the necessity of connecting the device through the handling of the attachment hooks themselves.

BRIEF DESCRIPTION OF DRAWINGS

FIG. 1 depicts a top perspective view of the invention.

FIG. 2 depicts a side perspective view of the invention.

FIG. 3 demonstrates the invention in its application to fasten materials to a surface.

DESCRIPTION OF THE PREFERRED EMBODIMENT

Referring to FIGS. 1, 2 and 3, the invention is generally indicated at 10, with the integrated handle extensions indicated at 11 and 12. There are two fastening hooks attached to the invention at 13 and 14. The strap is made of a resilient material so that it may be stretched yet will return to its original shape and length when tension is released.

The user of the invention should grasp the handle extensions 11, 12 and stretch the strap until it is of sufficient length that the fastening hooks 13, 14 are located near the desired fastening points 15, 16. The user then places the fastening hooks on the fastening points and releases the tension on the handle extensions. Alternatively, if the user desires using the strap to encircle materials so that they may be held together, the user may grasp both handle extensions 11, 12 and bring them around the perimeter of the materials to be encircled until the fastening hooks 13, 14 are located near each other. The user would then interlock the fastening hooks and release the tension on the handle extensions.

While a particular embodiment of the invention is shown, it will be understood by those skilled in the art that changes and modifications may be made thereto without departing from the invention in its broader aspects and as set forth in the following claim:

What is claimed is:

1. A device comprised of a fastening tension strap made of a resilient material of substantially cylindrical cross-section with integrated handles molded into the material and extending therefrom on each end of the strap, with the strap having attached to it two fastening hooks of S-shaped configuration engaging the strap with one terminal protruding through the strap at each end of the strap.

2. A device comprising:
   a fastening tension swap made of a resilient material and having first and second opposing ends with receiving holes therein;
   a pair of integrated handles molded into the resilient material of the fastening tension strap, the pair of integrated handles extending respectively from the first and second opposing ends of the fastening tension strap; and
   a pair of fastening hooks generally having S-shapes, each fastening hook having two terminals and, one terminal of each fastening book extending through one of the receiving holes in the first and second opposing ends of the fastening tension strap.

3. A device according to claim 2, wherein the fastening tension strap has a body portion extending from the first opposing end to the second opposing end, the first and second opposing ends having an enlarged cross section relative to the body portion.

4. A device according to claim 2, wherein the terminals protrude from the receiving holes in the first and second opposing ends of the fastening tension strap.

5. A device according to claim 2, wherein only one fastening hook is provided at each opposing end of the fastening tension strap.

6. A device according to claim 2, wherein the fastening tension strap has a body portion extending from the first opposing end to the second opposing end, the body portion having a substantially cylindrical cross-section.

* * * * *